(12) United States Patent
Schreiter et al.

(10) Patent No.: US 6,411,643 B1
(45) Date of Patent: Jun. 25, 2002

(54) AUTOMATIC ELECTRODE REGULATOR BASED ON DIRECT POWER FACTOR REGULATION AND METHOD

(75) Inventors: Till A. Schreiter, Squirrel Hill; Jörg Eiermann, McCandless Township, County of Allegheny, both of PA (US)

(73) Assignee: SMS Demag, Inc, Pittsburgh, PA (US)

( * ) Notice: Subject to any disclaimer, the term of this patent is extended or adjusted under 35 U.S.C. 154(b) by 42 days.

(21) Appl. No.: 09/669,582

(22) Filed: Sep. 26, 2000

Related U.S. Application Data (60) Provisional application No. 60/156,824, filed on Sep. 30, 1999.

(51) Int. Cl.$^7$ .............................................. H05B 7/148
(52) U.S. Cl. ..................................... 373/104; 373/105
(58) Field of Search .............................. 373/47, 49, 50, 373/102, 104, 105, 106; 323/210

(56) References Cited

U.S. PATENT DOCUMENTS

| | | | |
|---|---|---|---|
| 3,186,043 A | 6/1965 | Murtland, Jr. et al. | 373/104 |
| 3,209,060 A | 9/1965 | Borrebach | 373/102 |
| 3,229,148 A | 1/1966 | Moore | 314/75 |
| 3,435,121 A | 3/1969 | Jackson | 373/102 |
| 3,662,075 A | 5/1972 | Sakai et al. | 373/102 |
| 3,767,832 A | 10/1973 | Bennett | 373/104 |
| 4,029,888 A | 6/1977 | Roberts et al. | 373/104 |
| 4,096,344 A | 6/1978 | Munson | 373/104 |
| 4,324,944 A | 4/1982 | Weihrich et al. | 373/105 |
| 4,586,187 A | 4/1986 | Hein et al. | 373/106 |
| 4,607,373 A | 8/1986 | Bergman | 373/104 |
| 4,677,643 A | 6/1987 | Dicks | 373/105 |
| 4,683,577 A * | 7/1987 | Bretthauer et al. | 373/104 |
| 4,857,821 A | 8/1989 | Takeda | 323/210 |
| 5,115,447 A | 5/1992 | Bowman | 373/102 |
| 5,155,740 A | 10/1992 | Ao et al. | 373/108 |
| 5,204,872 A | 4/1993 | Staib et al. | 373/104 |
| 5,239,554 A | 8/1993 | Gensini et al. | 373/102 |
| 5,255,285 A | 10/1993 | Aberi et al. | 373/105 |
| 5,351,267 A | 9/1994 | Strebel | 373/105 |
| 5,406,581 A | 4/1995 | Staib et al. | 373/104 |
| 5,533,044 A | 7/1996 | Strebel | 373/104 |
| 5,539,768 A | 7/1996 | Kracich | 373/105 |
| 5,627,454 A | 5/1997 | Aebischer et al. | 323/210 |
| 5,809,054 A | 9/1998 | Oelscher | 373/104 |

\* cited by examiner

*Primary Examiner*—Tu Ba Hoang
(74) *Attorney, Agent, or Firm*—Clifford A. Poff (57) ABSTRACT

Disclosed is an electrode control system for an electric arc furnace having a furnace transformer. The electrode control system includes a current transformer for measuring operating current of the electrode and a voltage transformer for measuring operating voltage of the electrode. An active power transducer is connected to the current transformer and the voltage transformer for calculating active power of the electrode from the measured operating current and operating voltage as a first output signal. A reactive power transducer is connected to the current transformer and the voltage transformer for calculating the reactive power of the electrode from the measured operating current and operating voltage as a second output signal. A programmable control unit is connected to the active power transducer and the reactive transducer for receiving the first and second input signals. The control unit is configured to calculate actual power factor of the electrode from the first and second output signals and compare the actual power factor with a preprogrammed power factor set point. The control unit is configured to generate a control signal indicative of a difference between the actual power factor and the power factor set point. An electrode positioning mechanism is provided for controlling movement of the electrode. The electrode positioning mechanism is connected to the control unit for receiving the control signal and is configured to adjust a vertical height of the electrode such that the actual power factor approximates the power factor set point. A method of controlling the position of an electrode in an electric arc furnace is also disclosed.

24 Claims, 4 Drawing Sheets

AUTOMATIC ELECTRODE REGULATOR BASED ON DIRECT POWER FACTOR REGULATION AND METHOD

CROSS-REFERENCE TO RELATED APPLICATION

This application claims the benefit of U.S. Provisional Patent Application Ser. No. 60/156,824 filed Sep. 30, 1999, entitled "Automatic Electrode Regulator Based On Direct Power Factor Regulation and Method Therefor".

BACKGROUND OF THE INVENTION

1. Field of the Invention

The present invention relates to electric arc furnaces and, more particularly, to a control system and method for controlling electrodes in electric arc furnaces based on direct power factor regulation.

2. Description of the Prior Art

Typically, electric arc and, therefore, power input to an electric arc furnace is regulated by controlling the positioning of the electrodes in the electric arc furnace either manually or automatically. However, to provide consistent operation of the electric arc furnace, automatic regulation of the electrodes is preferred. In particular, the electric arc, or arc length, of the electrode is controlled by controlling the position of the electrode with respect to the level of molten metal contained in the electric arc furnace. Various types of electrode regulating systems are known in the art such as current regulating systems, impedance regulating systems, resistance regulating systems and power regulating systems. Impedance regulating systems are the most widespread and well-established in the industry. In impedance regulating systems, it is common practice to measure the current and voltage of the electrodes at the tertiary or secondary side of the furnace transformer to determine electrode impedance. The electrode impedance as a process input is then compared with a theoretical impedance value to maintain a constant electric arc, or arc length.

A principal disadvantage with impedance regulating systems is that an "optimum" power factor and, thus, an optimum working/operating condition of the electric arc furnace is difficult to achieve and maintain in practice. This is primarily due to the inherent complexity and time consuming efforts required for adjusting the theoretical impedance value to the required or "optimum" power factor of the electrode. In addition, the theoretical impedance is a constant and does not consider the frequently changing conditions in the electric arc furnace which necessitates continuous adjustments of the theoretical impedance. Optimum working/operating conditions are typically never met in electric arc furnaces that utilize impedance regulating systems. A typical impedance regulating system for electrodes in an electric furnace is disclosed by U.S. Pat. No. 5,255,285 to Aberl et al. (hereinafter "the Aberl patent").

The Aberl patent generally discloses an impedance based control system for an electric arc furnace that includes an electrode actuator, a controller for controlling the electrode actuator based on electrode impedance, and an impedance signal generator in which the electrode impedance is calculated. The controller is utilized to compare the electrode impedance with a desired impedance value. The impedance regulating system disclosed by the Aberl patent attempts to overcome the inherent deficiencies with impedance regulating systems by providing a feed back control loop or "correcting" signal to the controller. However, the "correcting" signal is nothing more than an indirect measure of the electrode impedance with an allowance for the resistance and inductive reactance of an electric lead connected to the furnace transformer of the electric arc furnace, and thus does little to improve the performance of the overall control system. Impedance type electrode regulating systems are generally time consuming and inefficient methods of control for electrodes in electric arc furnaces.

As discussed previously, electrode regulating systems may be based on such criteria as current, impedance and resistance. However, these values are only indirect measurements providing indirect information on the power input to the individual electrodes. The most important value, or control criteria, requiring scrutiny and generally ignored in the prior art is electrode power factor.

Figure 1:
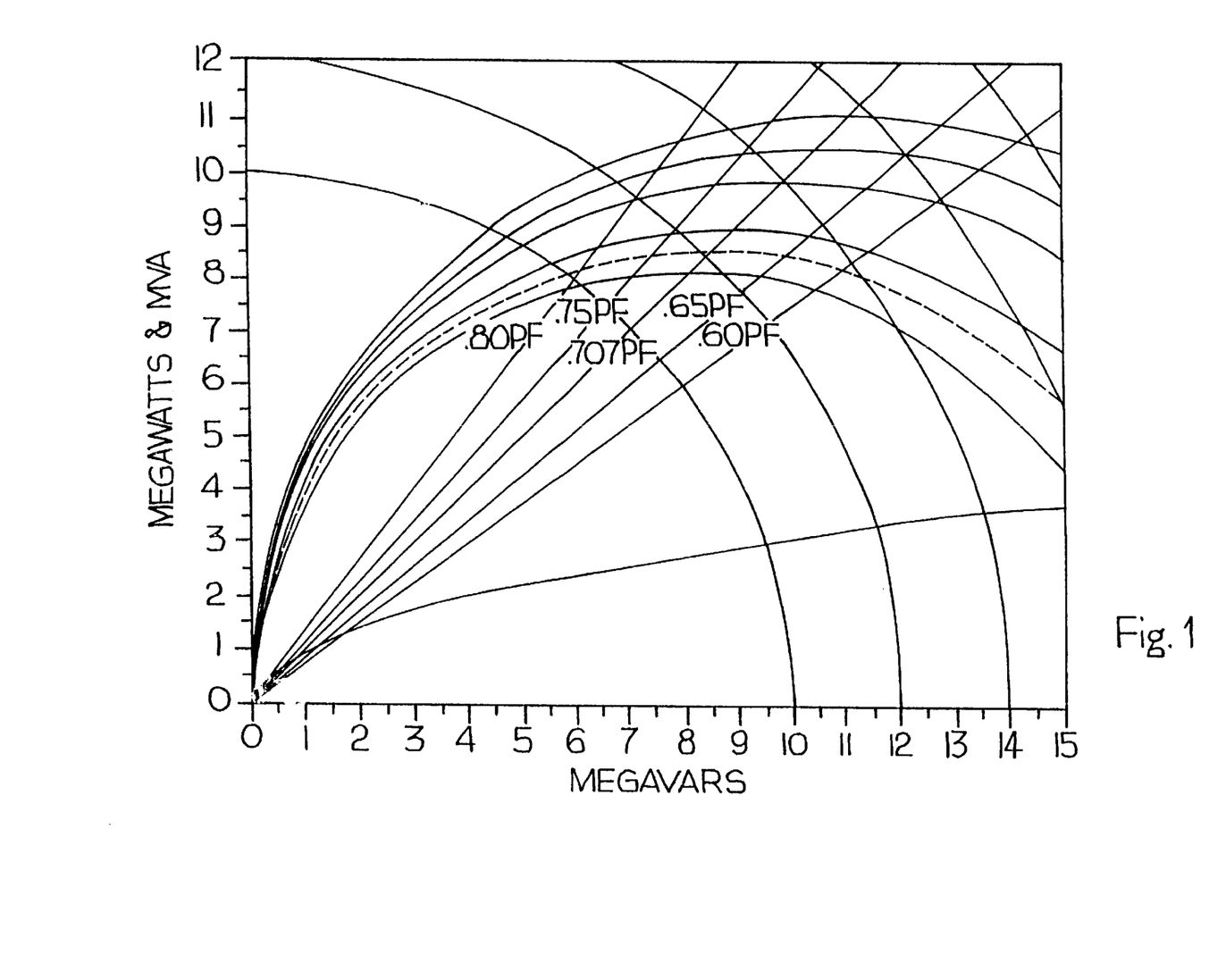
FIG. 1 is a circle diagram of operating voltage versus operating current for an electrode in an electric arc furnace showing power factor values for five power factor set points.

FIG. 1 illustrates how operating or "secondary" current, operating or "secondary" voltage, impedance and power input are related in electric arc furnaces. FIG. 1 is a circle diagram of operating voltage versus operating current and shows power factor values for five power factor set points. During normal operating conditions, the power input should be maximized and the electrode consumption minimized. The arc length should be stable and over-currents should be avoided. The circle diagram of FIG. 1 shows that maximum available power occurs at a power factor of cos =0.707. However, maximum power input does not necessarily result in a maximum rate of heating or optimal operation of the furnace when other factors such as electrode consumption or carbon pickup are considered. For this reason, most electric arc furnaces operate at slightly higher power factors ranging between cos =0.72 and 0.78.

Attempts have been made in the prior art to incorporate power factor into a control system for controlling electrodes in electric arc furnaces. However, these attempts have centered on utilizing power factor to control the power source for the electric arc furnace or as a secondary or "correcting" signal in what otherwise are well-known current or impedance based regulating systems. At best, these attempts have only succeeded in utilizing power factor as an indirect or secondary process input and, hence, are not true power factor based regulating systems.

For example, U.S. Pat. No. 3,435,121 to Jackson discloses an arc power responsive control system for consumable electrode furnaces that utilizes power factor as a control criteria or value for controlling a transformer power source of the furnace, rather than as a control criteria for controlling the positioning of the furnace electrodes. In particular, the transformer power source control circuit disclosed by the Jackson patent includes a power factor transducer which receives an arc current signal and an arc voltage signal from the transformer power source. From the power factor transducer, a signal indicative of the phase angle between the arc current signal and arc voltage signal is fed to a power factor level detector that compares the actual power factor with a desired power factor range. If actual power factor falls outside of the desired power factor range, the power factor level detector provides an output signal proportional to the difference directly to the transformer power source. The output signal provided to the transformer power source identifies which transformer tap should be used on the transformer power source. The output signal is not used as a process input to the electrode control circuit disclosed by the Jackson patent that actually controls the positioning of the electrodes in the furnace. The electrode control circuit disclosed by the Jackson patent is defined by a power transducer which receives the arc current and arc voltage signals from the transformer power source, a power averaging circuit, a power comparison circuit, a power reference source, an amplidyne, and an electrode drive motor. The output signal generated by the power factor level detector is not provided as a process input to this control circuit. Hence, the control system disclosed by the Jackson patent is not configured to change the positioning of the electrodes in the furnace based directly on power factor as a process input to the electrode control circuit.

Another prior art system which attempts to incorporate power factor in a control system for controlling electrodes in electric arc furnaces is disclosed by U.S. Pat. No. 3,662,075 to Sakai et al. (hereinafter "the Sakai patent"). The electrode control system disclosed by the Sakai patent includes an electrode driving mechanism, an automatic current regulator responsive to the current flowing through the electrode, and a program control unit connected between the automatic current regulator and the electrode driving mechanism for transmitting electrode control signals to the electrode driving mechanism. A power factor regulator responsive to the actual power factor of the furnace is connected to the program control unit to provide an error-correcting signal to the program control unit. The program control unit transmits electrode control signals to the electrode driving mechanism based on the current flowing through the electrode to raise or lower the electrode. The actual power factor of the electrode is transmitted by the power factor regulator to the program control unit to ensure that the electrode control signal sent to the electrode driving mechanism by the automatic current regulator moves the electrode in the correct direction, i.e., up or down, in the electric arc furnace. The correcting signal generated by the power factor regulator is provided because of the errors associated with regulating the electrode based on operating current. For example, under certain operating conditions, the automatic current regulator may provide an incorrect "lower" signal to the program control unit which is "corrected" by the correcting signal generated by the power factor regulator and sent to the program control unit. Hence, the program control unit disclosed by the Sakai patent requires two input signals, a primary "control" signal from the automatic current regulator and a secondary or correcting signal from the power factor regulator, and, consequently, does not regulate purely on power factor. The control system disclosed by the Sakai patent is primarily a current based regulating system which utilizes power factor only secondarily to correct errors.

While systems are known in the prior art which attempt to incorporate power factor into a control system for controlling electrodes in electric arc furnaces, these prior art systems utilize power factor only as a secondary or correcting signal, or used to control the power source of the electric arc furnaces. In addition these prior art systems only generate a signal indicative of power factor when the actual power factor of the electrode falls outside of a power factor range. Consequently, because these prior art systems cannot establish and maintain a preselected power factor set point, optimum working/operating conditions of the electric arc furnaces are never met.

In view of the foregoing, it is an object of the present invention to provide an electrode control system and method for controlling the positioning of electrodes in electric arc furnaces based on direct power factor regulation. It is also an object of the present invention to provide an electrode control system capable of both impedance based regulation and direct power factor regulation.

SUMMARY OF THE INVENTION

The above objects are accomplished with an electrode control system for an electric arc furnace and a method of controlling the position of an electrode in an electric arc furnace in accordance with the present invention. In particular, the present invention relates to an automatic electrode regulation or control system for regulating electric arc, or "arc length", of electrodes in electric arc scrap metal furnaces and electric arc ladle furnaces of the alternating current (AC) type. The electrode control system of the present invention includes a current transformer for measuring operating current of the electrode and a voltage transformer for measuring operating voltage of the electrode. An active power transducer is connected to the current transformer and the voltage transformer for calculating active power of the electrode from the measured operating current and operating voltage as a first output signal. A reactive power transducer is connected to the current transformer and the voltage transformer for calculating the reactive power of the electrode from the measured operating current and operating voltage as a second output signal. A programmable control unit is connected to the active power transducer and the reactive power transducer for receiving the first and second output signals. The control unit is configured to calculate actual power factor of the electrode from the first and second output signals and compare the actual power factor with a preprogrammed power factor set point. The control unit is further configured to generate a control signal indicative of the difference between the actual power factor and the power factor set point. An electrode positioning mechanism is provided for controlling movement of the electrode. The electrode positioning mechanism is connected to the control unit for receiving the control signal. The electrode positioning mechanism is configured to adjust a vertical height of the electrode such that the actual power factor approximates the power factor set point.

The control unit may further include a power factor calculation unit connected to the active and reactive power transducers for receiving the first and second output signals. The power factor calculation unit may be configured to calculate the actual power factor of the electrode and generate a third output signal indicative of the actual power factor of the electrode. The control unit may further include a controller connected to the power factor calculation unit for receiving the third output signal. The controller may be configured to compare the third output signal with the power factor set point and generate the control signal for the electrode positioning mechanism.

The electrode positioning mechanism preferably controls the height of the electrode relative to a level of molten metal contained in the electric arc furnace. The electrode positioning mechanism may be an electromechanical device operatively connected to the electrode for adjusting the vertical height of the electrode. The furnace transformer may include a secondary side. The current transformer and voltage transformer may be connected to the furnace transformer at the secondary side for measuring the operating current and operating voltage of the electrode. The programmable control unit may be a programmable computer.

The present invention is also a method of controlling the position of an electrode in an electric arc furnace having a furnace transformer and an electrode positioning mechanism. The method may include the steps of: determining active power of the electrode from operating current and operating voltage of the electrode; determining reactive power of the electrode from the operating current and the operating voltage of the electrode; calculating the actual power factor of the electrode from the active power and the reactive power of the electrode; comparing the actual power factor with a preselected power factor set point for the electrode; providing a control signal indicative of a difference between the actual power factor and the preselected power factor set point to the electrode positioning mechanism; and controlling a vertical height of the electrode with respect to a level of molten metal in the electric are furnace with the electrode positioning mechanism based on the control signal such that the actual power factor of the electrode approximates the power factor set point.

In addition the present invention is an electrode control system capable of both impedance based regulation and power factor based regulation in an electric arc furnace. Accordingly, the electrode control system discussed previously may further include an electrode impedance calculation unit connected to the current transformer via a current transducer and the voltage transformer via a voltage transducer for calculating electrode impedance from the measured operating current and the operating voltage. The programmable control unit may be connected to the active power transducer, the reactive power transducer and, further, connected to the electrode impedance calculation unit. The control unit may be configured to calculate the actual power factor of the electrode from the active and reactive power of the electrode and compare the actual power factor with a preprogrammed power factor set point. The control unit may be configured to compare the electrode impedance with a preprogrammed impedance set point. The control unit may also be configured to generate a control signal indicative of a difference between the actual power factor and the power factor set point or the difference between the electrode impedance and the impedance set point. The electrode positioning mechanism may be connected to the control unit for receiving the control signal, and may be configured to continuously adjust the vertical height of the electrode such that the actual power factor approximates the power factor set point or the electrode impedance approximates the impedance set point.

Furthermore, the present invention is a method of controlling the position of an electrode in an electric arc furnace based on impedance or power factor regulation. Accordingly, the previously discussed method may further include the steps of determining electrode impedance from the operating current and the operating voltage of the electrode; providing to the electrode positioning mechanism a control signal indicative of a difference between the actual power factor and a preselected power factor set point or the difference between the electrode impedance and a preselected impedance set point; and controlling a vertical height of the electrode with respect to a level of molten metal in the electric arc furnace with the electrode positioning mechanism based on the control signal such that the actual power factor of the electrode approximates the power factor set point or the electrode impedance approximates the impedance set point.

Further details and advantages will become apparent from the following detailed description, in conjunction with the drawings.

DESCRIPTION OF THE PREFERRED EMBODIMENTS

Figure 2:
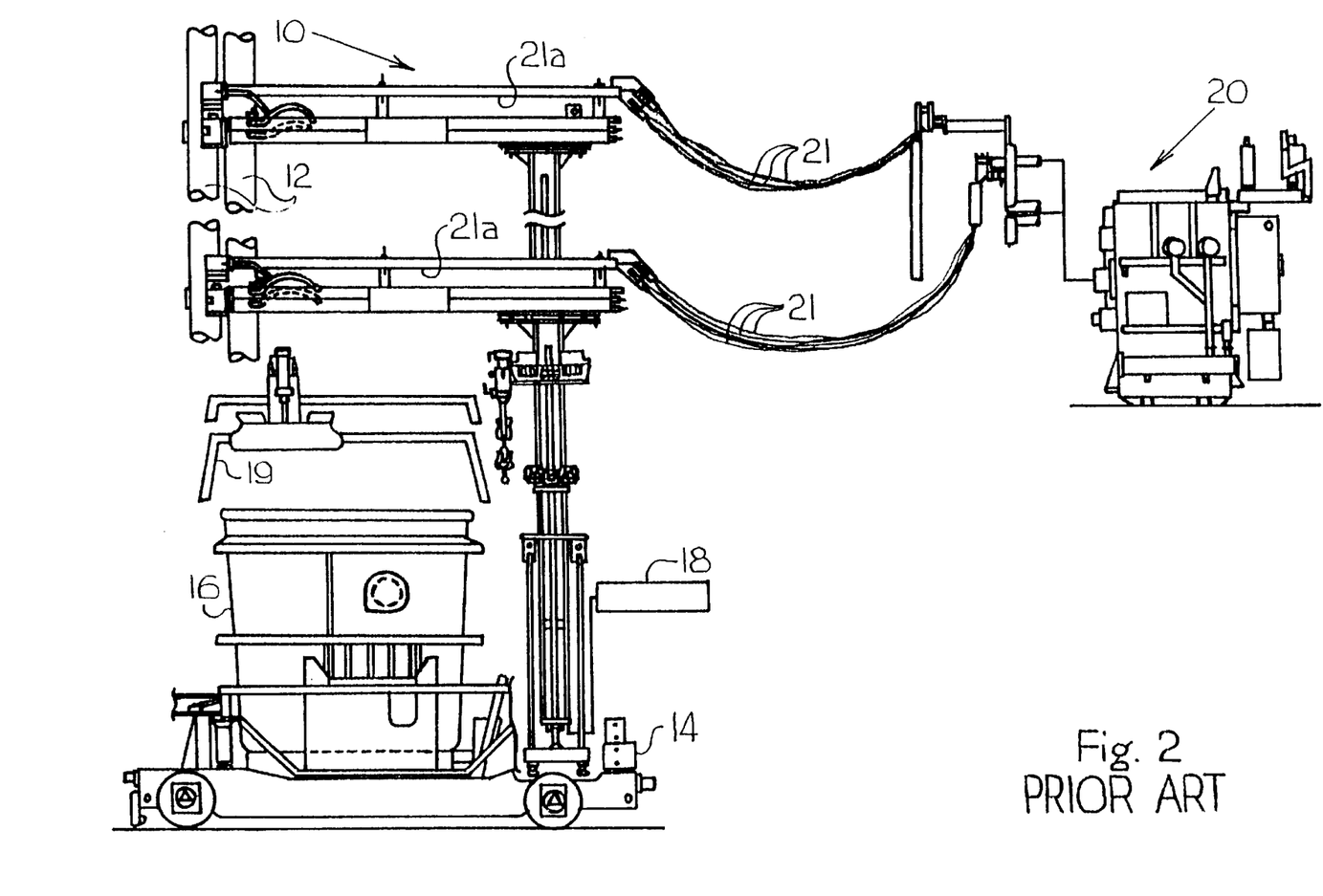
FIG. 2 is an elevational side view of a prior art electric arc furnace system.

FIG. 2 shows a prior art electric arc furnace 10 having electrodes 12. The furnace 10 shown in FIG. 2 is an electric arc ladle furnace. However, the invention as described hereinafter may be utilized within any type of electric arc furnace such as an electric arc scrap metal furnace, as will be appreciated by those skilled in the art. The furnace 10 generally includes a ladle transfer car 14 having a ladle 16 positioned thereon, an electrode positioning mechanism 18 for raising and lowering the respective electrodes 12, a ladle roof 19 and, furthermore, the electrodes 12. The electrodes 12 are powered by a power source (not shown) through a furnace transformer 20 via water-cooled copper cables 21 and via an electric arm copper bus 21a.

Figure 3:
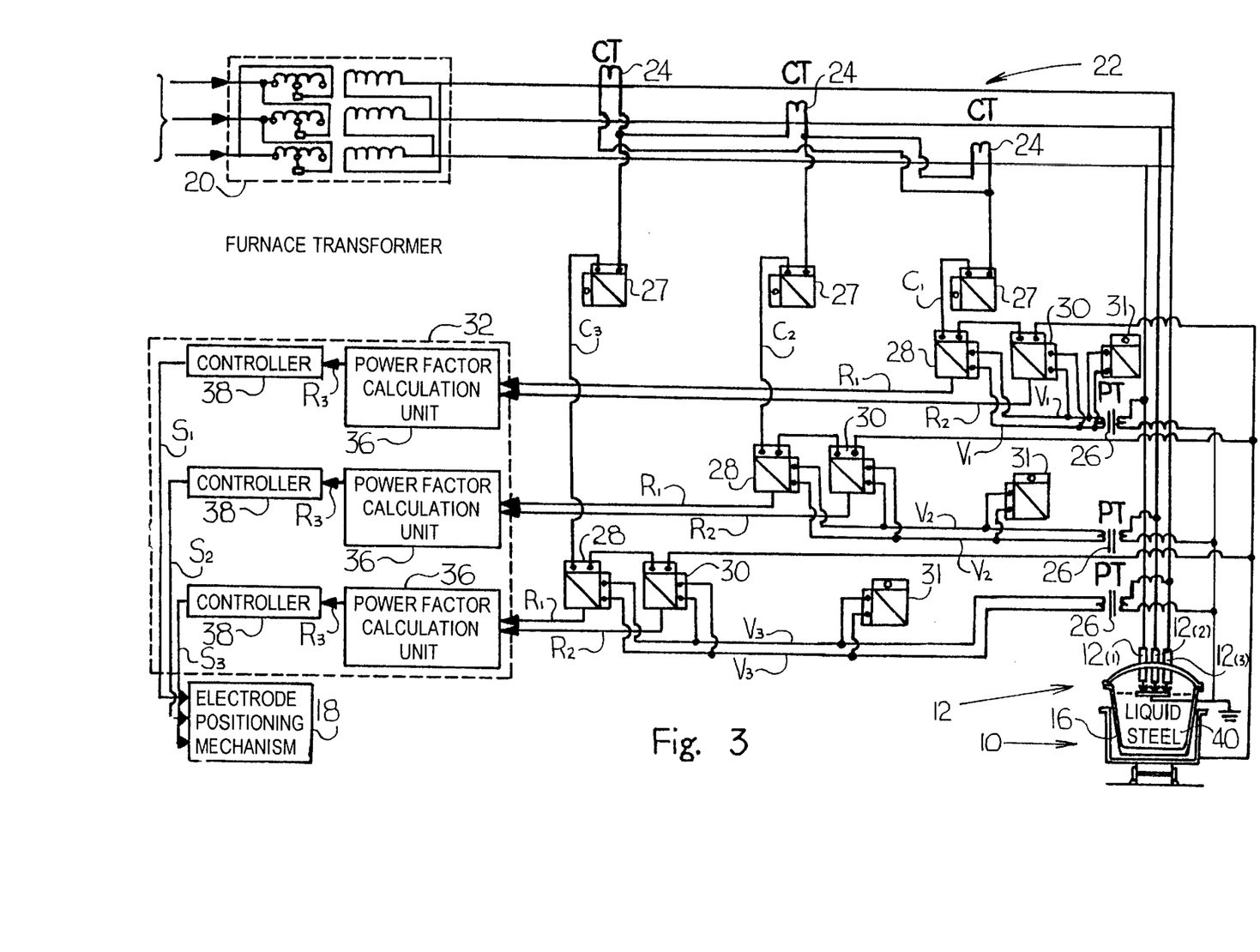
FIG. 3 is a schematic circuit diagram of an electrode control system in accordance with the present invention.

FIG. 3 shows an automatic electrode control system 22 in accordance with the present invention for the furnace 10 and configured to control the electrodes 12 based on direct power factor regulation. The system 22 generally includes the furnace transformer 20 connected to each of the electrodes 12, via methods and apparatus known in the art which are separately identified with reference numbers 12(1), 12(2) and 12(3) in FIG. 3. A current transformer 24 is connected to the secondary side, also known as the tertiary side, of the transformer 20 for each of the electrodes 12 to measure the operating current of the electrodes 12. The current transformers 24 are standard equipment and are well known in the art. The current transformers 24 provide current output signals $C_1$, $C_2$, $C_3$ indicative of the operating current of the respective electrodes 12. A secondary phase to ground voltage transformer 26 is also connected to the secondary side of the transformer 20 for each of the electrodes 12. The voltage transformers 26 are standard equipment and are well known in the art. The voltage transformers 26 provide voltage output signals $V_1$, $V_2$, $V_3$ indicative of the operating voltage of the respective electrodes 12.

Figure 4:
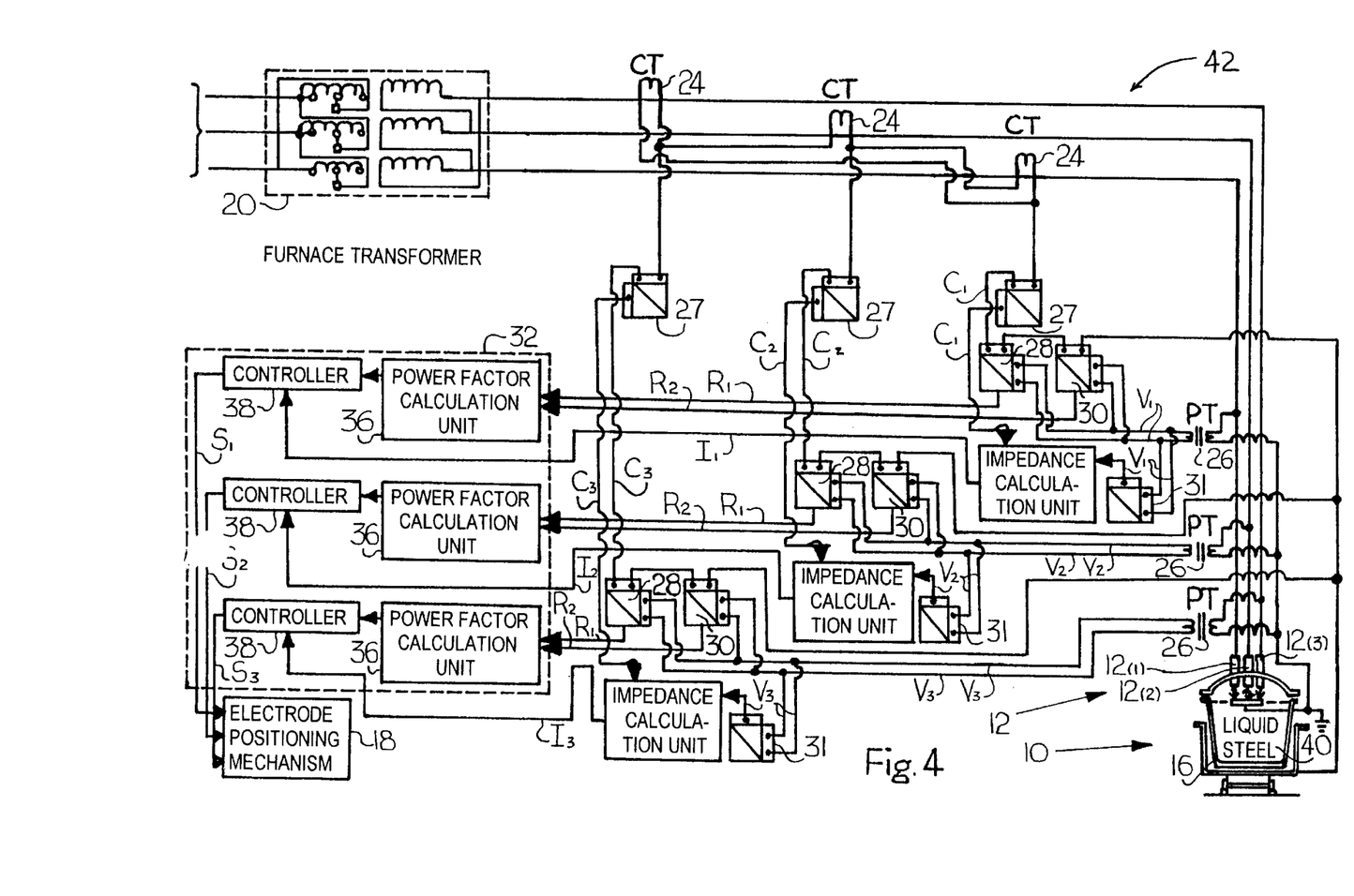
FIG. 4 is a schematic circuit diagram of a second embodiment of the electrode control system of the present invention.

The electrode control system 22 may further include current transducers 27 connected, respectively, to the current transformers 26 for the electrodes 12. In the direct power factor regulation mode of the present invention illustrated in FIG. 3, the current output signals $C_1$, $C_2$, $C_3$ for the electrodes 12 pass through the respective current transducers 27. Thus, the current transducers 27 are not necessary in the direct power factor regulation mode illustrated in FIG. 3, but may be included when the electrode control system 22 is part of a dual mode power factor and impedance based regulation system as illustrated in FIG. 4 discussed hereinafter. The current transducers 27 may be further connected to a display screen/control panel (not shown) for the electrode control system 22 so that an operator may monitor the operating current of the electrodes 12 and make adjustments accordingly. The current transducers 27 are standard equipment and are well known in the art.

The current transformers 24 and the voltage transformers 26 located at the secondary side of the transformer 20 are connected, respectively, to an active power transducer 28 and a reactive power transducer 30 for each of the electrodes 12. The current transducers 27, if present, are located and connected between the current transformers 24 and the active and reactive power transducers 28, 30. The active and reactive power transducers 28, 30 generate respective first and second output signals $R_1$, $R_2$ indicative of active and reactive power components of the respective electrodes 12 which are used to calculate the actual or "measured" power factor of the electrodes 12. The active and reactive power transducers 28, 30 calculate the active and reactive power components of the electrodes 12 based on the measured operating current and operating voltage provided by the current transformers 24 and voltage transformers 26. The active and reactive power components of the respective electrodes 12 are then provided as the first and second output signals $R_1$, $R_2$. For example, the active power transducer 28 connected to the first electrode 12(1) calculates the active power of the first electrode 12(1) and generates the first output signal $R_1$ indicative of this value. Similarly, the reactive power transducer 30 connected to the first electrode 12(1) calculates the reactive power component of the first electrode 12(1) and generates the second output signal $R_2$ indicative of this value.

The electrode control system 22 may further include a voltage transducer 31 connected to the secondary side of the transformer 20 for each of the electrodes 12 to measure the operating voltage of the respective electrodes 12. Although not used as a process value input in the power factor regulation mode illustrated in FIG. 3, the voltage output signals $V_1$, $V_2$, $V_3$ from the respective voltage transducers 31 are used in the impedance regulation mode of the present invention illustrated in FIG. 4 as discussed hereinafter. The voltage output signals $V_1$, $V_2$, $V_3$ may be displayed on the display screen/control panel (not shown) for the electrode control system 22 along with the current output signals $C_1$, $C_2$, $C_3$ from the current transducers 27 discussed previously. The voltage transducers 31 are standard equipment and are well known in the art The first and second output signals $R_1$, $R_2$ indicative of the respective active and reactive power components of the electrodes 12 are transmitted to a programmable logic controller (PLC) or programmable computer (hereinafter referred to as "control unit 32"), which generates respective control signals $S_1$, $S_2$, $S_3$ which are sent to the electrode positioning mechanism 18. The electrode positioning mechanism 18 may be an electromechanical controller having a controlled hydraulic valve (not shown). The electrode positioning system 18 provides for vertical movement of the respective electrodes 12. The electrode positioning mechanism 18 shown in block form in FIG. 3 is equivalent to the electrode positioning mechanism 18 shown in FIG. 2 and is well known and standard in the industry. The control unit 32 may be an Alan Bradley PLC Model 5/40E and equivalents thereto.

The control unit 32 preferably includes a power factor calculation unit 36 for each of the electrodes 12 that receives the first and second output signals $R_1$, $R_2$ from the corresponding active and reactive power transducers 28, 30. The power factor calculation units 36 are configured to calculate the actual power factor of the respective electrodes 12 based on the first and second output signals $R_1$, $R_2$, and generate a third output signal $R_3$ indicative of the actual power factor of the respective electrodes 12. The third output signals $R_3$ generated by the power factor calculation units 36 are sent to respective controllers 38 which correspond to the power factor calculation units 36. The controllers 38 are preferably preprogrammable to have a preselected power factor set point and are configured to compare the actual power factor of the electrodes 12 with the preselected power factor set point. The controllers 38 then generate the individual control signals $S_1$, $S_2$, $S_3$ which are sent to the electrode positioning mechanism 18 to correctly position the respective electrodes 12.

The electrode positioning mechanism 18 based on the control signals $S_1$, $S_2$, $S_3$ will continuously adjust the vertical position of the respective electrodes 12 to maintain the actual power factor of the electrodes 12 approximately at the preselected power factor set point for each of the electrodes 12. In particular, the electrode positioning mechanism 18 based on the control signals $S_1$, $S_2$, $S_3$ continuously controls the vertical positioning of the respective electrodes 12 relative to a level of molten steel 40 in the ladle 16 such that the actual power factor of each electrode 12 substantially corresponds to, i.e., approximates, the preselected power factor set point for the electrode 12. In this manner, a constant power factor set point in each individual electrode 12 is substantially maintained and optimized. The control signals $S_1$, $S_2$, $S_3$ generated by the control unit 32 are continuous and thus the control unit 32 continuously adjusts the electrode positioning mechanism 18 to maintain the actual power factor substantially at the preselected power factor set point for each of the electrodes 12.

The control signals $S_1$, $S_2$, $S_3$ generated by the control unit 32 are based on the actual power factor of the respective electrodes 12 as process value inputs, and additional or corrective control signals such as those found in the prior art discussed previously are not required. Additionally, because the control signals $S_1$, $S_2$, $S_3$ are directly indicative of power factor, the above-described system is a true power factor based regulating system in contrast to the prior art control systems discussed previously.

The present invention is also a method of continuously controlling the position of the electrodes 12 in the electric arc furnace 10 and generally includes the steps of: measuring operating current of the electrode at the secondary side of the furnace transformer; measuring operating voltage of the electrode at the secondary side of the transformer; determining active power of the electrode from the operating current and the operating voltage of the electrode; generating a first output signal indicative of the active power of the electrode; determining reactive power of the electrode from the operating current and the operating voltage of the electrode; generating a second output signal indicative of the reactive power of the electrode; calculating actual power factor of the electrode from the active power and the reactive power in a programmable control unit; comparing the actual power factor with a preselected power factor set point for the electrode in the programmable control unit, with the control unit preferably including a power factor calculation unit and a controller; providing a control signal indicative of a difference between the actual power factor and the power factor set point to an electrode positioning mechanism; and controlling the vertical height of the electrode with respect to a level of molten metal in the electric arc furnace with the electrode positioning mechanism based on the control signal such that the actual power factor of the electrode approximates the power factor set point.

The method may also include the steps of: receiving the first and second output signals at the power factor calculation unit for calculating the actual power factor of the electrode; generating a third output signal indicative of the actual power factor of the electrode in the power factor calculation unit; and receiving the third output signal at the controller such that the step of comparing the actual power factor with the preselected power factor set point for the electrode occurs in the controller which then generates the control signal. The control signal is preferably continuous such that the electrode positioning mechanism continuously adjusts the vertical height of the electrode relative to the level of molten metal in the electric arc furnace to maintain the actual power factor of the electrode approximately at the power factor set point.

Referring now to FIG. 4, a second embodiment of the electrode control system of the present invention is shown and generally designated with reference number 42. The electrode control system 42 of FIG. 4 is a dual mode system capable of controlling the electrodes 12 based on direct power factor regulation or electrode impedance regulation. The electrode control system 42 of FIG. 4 is substantially similar to the electrode control system 22 of FIG. 3, but further includes an electrode impedance calculation unit 44 connected to the output of the current transducer 27 and the output of the voltage transducer 31 for each of the electrodes 12. In the dual mode system of FIG. 4, when impedance based regulation is selected the measured value of the operating current from the current transformers 24 is received by the current transducers 27, and the measured value of the operating voltage is received by the voltage transducers 31. The current transducers 27 are provided to scale the measured value of the operating current of the respective electrodes 12 to be suitable process value inputs to the impedance calculation units 44. Accordingly, the current transducers 27 provide the respective current output signals $C_1$, $C_2$, $C_3$ as "scaled" process value inputs to the calculation units 44.

For example the current transducer 27 for the first electrode 12(1) receives the measured value of the operating current of the first electrode 12(1) from the current transformer 24 and appropriately scales this received value as necessary to be a suitable process value input to the impedance calculation unit 44 for the first electrode 12(1). The measured value from the current transformer 24 may, for example, be 0.5 A and the current transducer 27 may scale this received value, for example, to 4.20 mA to make this measured value a suitable process value input to the impedance calculation unit 44 for the first electrode 12(1). The voltage transducers 31 operate in a similar manner to the current transducers 27 as will be appreciated by those skilled in the art. The voltage transducers 31 provide to voltage output signals $V_1$, $V_2$, $V_3$ as "scaled" process value inputs to the impedance calculation units 44. As stated previously, the current transducers 27 and the voltage transducers 31 are not necessary in the power factor regulation mode discussed previously in connection with FIG. 3.

The electrode impedance calculation units 44 enable the electrode control system 42 shown in FIG. 4 to regulate the electrodes 12 based on either electrode impedance or power factor, depending on which mode is selected. Changing between the two operating modes may be performed by an operator directly using a selector switch on the display screen/control panel (not shown) of the control unit 32 which then generates an input signal to the control unit 32 or, alternatively, by an automatic process control system (not shown) sending a control signal to the control unit 32 and, in particular, the controllers 38. This automatic process control system signal will depend on the melting/refining process conditions present in the furnace, as will be appreciated by those skilled in the art.

The electrode impedance calculation units 44 for the respective electrodes 12 are connected directly to the corresponding controllers 38 located in the control unit 32. As discussed previously, the process value inputs to the electrode impedance calculation units 44 are the measured values of the operating current $C_1$, $C_2$, $C_3$ and operating voltage $V_1$, $V_2$, $V_3$ of the respective electrodes as measured by the current transformers 24 via the current transducers 27 and by the voltage transformers 26 via the voltage transducers 31. The impedance calculation units 44 calculate the electrode impedance of the respective electrodes 12 from these process value inputs. The electrode impedance calculation units 44 provide respective impedance output signals, which are identified in FIG. 4 with reference characters $I_1$, $I_2$, $I_3$, to the respective controllers 38 located in the control unit 32 when the impedance based regulation mode is selected.

The control unit 32 and, in particular, the controllers 38 are preferably configured such that in the impedance based regulation mode the impedance output signals $I_1$, $I_2$, $I_3$, are used as the basis for generating the control signals $S_1$, $S_2$, $S_3$. In the previously discussed power factor mode, the third output signals $R_3$ were indicative of electrode power factor and used as the basis for generating the control signals $S_1$, $S_2$, $S_3$. In the electrode control system 42 of FIG. 4, it will be appreciated that the control signals $S_1$, $S_2$, $S_3$ may be electrode impedance based control signals or power factor based control signals depending on which mode is selected.

In a similar manner to the power factor control mode discussed previously, the controllers 38 are preferably preprogrammable to have a preselected or preprogrammed impedance set point. The controllers 38 are thus configured to compare the electrode impedance of the respective electrodes 12 provided by the electrode impedance calculation units 44 with the preprogrammed impedance set point. The controllers 38 then generate the control signals $S_1$, $S_2$, $S_3$. However, in the impedance based regulation mode the control signals $S_1$, $S_2$, $S_3$ are now indicative of a difference between the electrode impedance and the preselected impedance set point, rather than a difference between actual power factor and a preselected power factor set point. In the impedance based regulation mode of the electrode control system 42 of FIG. 4, the electrode control system 42 is less efficient in maintaining or approximating "optimum" working/operating conditions in the electric arc furnace 10. However, the electrode control system 42 of FIG. 4 provides the capability of regulating the electrodes 12 based on either power factor or impedance.

The present invention provides an electrode control system for controlling the position of electrodes in an electric arc furnace based on direct power factor regulation. The electrode control system of the present invention is capable of maintaining the actual power factor of the electrodes substantially at a preprogrammed or preselected power factor set point, which may be selected to optimize working/operating conditions in the furnace. In addition, the present invention provides an electrode control system capable of both impedance based regulation and direct power factor regulation in a single system.

Although this invention was described with reference to preferred embodiments, obvious modifications and alterations of the present invention may be made without departing from the spirit and scope of the invention. The scope of the present invention is defined in the appended claims and equivalents thereto.

We claim:

1. An electrode control system for an electric arc furnace having a furnace transformer, comprising:

a current transformer for measuring operating current of the electrode;

a voltage transformer for measuring operating voltage of the electrode;

an active power transducer connected to the current transformer and the voltage transformer for calculating active power of the electrode from the measured operating current and operating voltage as a first output signal;

a reactive power transducer connected to the current transformer and the voltage transformer for calculating the reactive power of the electrode from the measured operating current and operating voltage as a second output signal;

a programmable control unit connected to the active power transducer and the reactive power transducer for receiving the first and second output signals, with the control unit configured to calculate actual power factor of the electrode from the first and second output signals and compare the actual power factor with a preprogrammed power factor set point, and with the control unit configured to generate a control signal indicative of a difference between the actual power factor and the power factor set point; and an electrode positioning mechanism for controlling movement of the electrode, with the electrode positioning mechanism connected to the control unit for receiving the control signal and configured to adjust a vertical height of the electrode such that the actual power factor approximates the power factor set point.

2. The electrode control system of claim 1, wherein the control unit further includes a power factor calculation unit connected to the active and reactive power transducers for receiving the first and second output signals, and wherein the power factor calculation unit is configured to calculate the actual power factor of the electrode and generate a third output signal indicative of the actual power factor of the electrode.

3. The electrode control system of claim 2, wherein the control unit further includes a controller connected to the power factor calculation unit for receiving the third output signal, and wherein the controller is configured to compare the third output signal with the power factor set point and generate the control signal for the electrode positioning mechanism.

4. The electrode control system of claim 1, wherein the electrode positioning mechanism controls the vertical height of the electrode relative to a level of molten metal contained in the electric arc furnace.

5. The electrode control system of claim 1, wherein the electrode positioning mechanism is an electromechanical device operatively connected to the electrode for adjusting the vertical height of the electrode relative to a level of molten metal contained in the electric arc furnace.

6. The electrode control system of claim 1, wherein the furnace transformer includes a secondary side, and wherein the current transformer and the voltage transformer are connected to the furnace transformer at the secondary side for measuring the operating current and operating voltage of the electrode.

7. The electrode control system of claim 1, wherein the programmable control Unit is a programmable computer.

8. A method of controlling the position of an electrode in an electric arc furnace having a furnace transformer and an electrode positioning mechanism, comprising the steps of:

determining active power of the electrode from operating current and operating voltage of the electrode;

determining reactive power of the electrode from the operating current and the operating voltage of the electrode;

calculating the actual power factor of the electrode from the active power and the reactive power of the electrode;

comparing the actual power factor with a preselected power factor set point for the electrode;

providing a control signal indicative of a difference between the actual power factor and the preselected power factor set point to the electrode positioning mechanism; and controlling a vertical height of the electrode with respect to a level of molten metal in the electric arc furnace with the electrode positioning mechanism based on the control signal such that the actual power factor of the electrode approximates the power factor set point.

9. The method of claim 8, further including the step of measuring the operating current at a secondary side of the furnace transformer.

10. The method of claim 8, further including the step of measuring the operating voltage at a secondary side of the furnace transformer.

11. The method of claim 8, wherein the step of calculating the actual power factor of the electrode occurs in a programmable control unit.

12. The method of claim 8, wherein the step of comparing the actual power factor with the preselected power factor set point occurs in a programmable control unit.

13. The method of claim 8, wherein the control signal is continuous such that the electrode positioning mechanism continuously adjusts the vertical height of the electrode relative to the level of molten metal in the electric arc furnace to maintain the actual power factor of the electrode approximately at the power factor set point.

14. The method of claim 8, further including the step of generating a first output signal indicative of the active power of the electrode.

15. The method of claim 14, further including the step of generating a second output signal indicative of the reactive power of the electrode.

16. The method of claim 15, further including the step of receiving the first and second output signals at a programmable control unit for calculating the actual power factor of the electrode.

17. The method of claim 16, wherein the control unit includes a power factor calculation unit for receiving the first and second output signals, and wherein the step of calculating the actual power factor of the electrode occurs in the power factor calculation unit.

18. The method of claim 17, further including the step of generating a third output signal indicative of the actual power factor of the electrode in the power factor calculation unit.

19. The method of claim 18, wherein the control unit further includes a controller connected to the power factor calculation unit for receiving the third output signal, and wherein the step of comparing the actual power factor with the preselected power factor set point for the electrode occurs in the controller which then generates the control signal.

20. The method of claim 19, wherein the control signal is continuous such that the electrode positioning mechanism continuously adjusts the vertical height of the electrode relative to the level of molten metal in the electric arc furnace to maintain the actual power factor of the electrode approximately at the preselected power factor set point.

21. An electrode control system capable of both impedance based regulation and power factor based regulation in an electric arc furnace having a furnace transformer, comprising:

a current transformer for measuring operating current of the electrode;

a voltage transformer for measuring operating voltage of the electrode;

an active power transducer connected to the current transformer and the voltage transformer for calculating active power of the electrode from the operating current and the operating voltage;

a reactive power transducer connected to the current transformer and the voltage transformer for calculating the reactive power of the electrode from the operating current and the operating voltage;

an electrode impedance calculation unit connected to the current transformer via a current transducer and the voltage transformer via a voltage transducer for calculating electrode impedance from the operating current and the operating voltage;

a programmable control unit connected to the active power transducer and the reactive power transducer and further connected to the electrode impedance calculation unit, the control unit configured to calculate actual power factor of the electrode from the active and reactive power of the electrode and compare the actual power factor with a preprogrammed power factor set point, the control unit configured to compare the electrode impedance with a preprogrammed impedance set point, and the control unit further configured to generate a control signal indicative of one of a difference between the actual power factor and the power factor set point and the difference between the electrode impedance and the impedance set point; and an electrode positioning mechanism for controlling movement of the electrode, with the electrode positioning mechanism connected to the control unit for receiving the control signal and configured to continuously adjust a vertical height of the electrode such that one of the actual power factor approximates the power factor set point and the electrode impedance approximates the impedance set point.

22. A method of controlling the position of an electrode in an electric arc furnace having a furnace transformer and an electrode positioning mechanism, comprising the steps of:

determining active power of the electrode from operating current and operating voltage of the electrode;

determining reactive power of the electrode from the operating current and the operating voltage of the electrode;

calculating the actual power factor of the electrode from the active power and the reactive power of the electrode;

determining electrode impedance from the operating current and the operating voltage of the electrode;

providing to the electrode positioning mechanism a control signal indicative of one of a difference between the actual power factor and a preselected power factor set point and the difference between the electrode impedance and a preselected impedance set point; and controlling a vertical height of the electrode with respect to a level of molten metal in the electric arc furnace with the electrode positioning mechanism based on the control signal such that one of the actual power factor of the electrode approximates the power factor set point and the electrode impedance approximates the impedance set point.

23. The method of claim 22, further including the step of measuring the operating current and the operating voltage at a secondary side of the furnace transformer.

24. The method of claim 22, wherein the control signal is continuous such that the electrode positioning mechanism continuously adjusts the vertical height of the electrode relative to the level of molten metal in the electric arc furnace to maintain one of the actual power factor approximately at the power factor set point and the electrode impedance approximately at the impedance set point.

* * * * *